United States Patent
Foulger et al.

(10) Patent No.: US 8,015,047 B2
(45) Date of Patent: Sep. 6, 2011

(54) METHOD, SYSTEM, AND COMPUTER PROGRAM PRODUCT FOR EMPLOYMENT MARKET STATISTICS GENERATION AND ANALYSIS

(75) Inventors: Michael G. Foulger, Novato, CA (US); Jeremy S. Cooper, Petaluma, CA (US); Michael Sea Luu, Petaluma, CA (US); Peter B. van Gorder, Sebastopol, CA (US)

(73) Assignee: Archeron Limited LLC, Wilmington, DE (US)

( * ) Notice: Subject to any disclaimer, the term of this patent is extended or adjusted under 35 U.S.C. 154(b) by 2344 days.

(21) Appl. No.: 09/841,167

(22) Filed: Apr. 25, 2001

(65) Prior Publication Data

US 2002/0016730 A1    Feb. 7, 2002

Related U.S. Application Data

(60) Provisional application No. 60/199,376, filed on Apr. 25, 2000.

(51) Int. Cl.
    *G06Q 10/00*  (2006.01)
(52) U.S. Cl. ....... 705/7.14; 705/7.13; 705/320; 705/321
(58) Field of Classification Search .................. 705/1, 8, 705/9, 10, 7.13, 7.14, 320, 321; 709/230–235
    See application file for complete search history.

(56) References Cited

U.S. PATENT DOCUMENTS

| | | | |
|---|---|---|---|
| 5,164,897 A * | 11/1992 | Clark et al. ........................ 705/1 |
| 5,265,033 A | 11/1993 | Vajk et al. |
| 5,532,838 A | 7/1996 | Barbari |
| 5,583,995 A | 12/1996 | Gardner et al. .......... 395/200.09 |
| 5,793,972 A | 8/1998 | Shane |
| 5,796,952 A | 8/1998 | Davis et al. |
| 5,808,566 A | 9/1998 | Behr |
| 5,818,447 A | 10/1998 | Wolf et al. |
| 5,832,497 A | 11/1998 | Taylor |
| 5,870,552 A | 2/1999 | Dozier et al. |
| 5,875,175 A | 2/1999 | Sherer et al. |
| 5,908,465 A | 6/1999 | Ito et al. |
| 5,933,811 A | 8/1999 | Angles et al. |
| 5,937,162 A | 8/1999 | Funk et al. |
| 5,966,695 A | 10/1999 | Melchione et al. |
| 5,970,062 A | 10/1999 | Bauchot |

(Continued)

FOREIGN PATENT DOCUMENTS

EP    0989501 A2    9/1999

(Continued)

OTHER PUBLICATIONS

Branscum, Deborah, "Sites to Help Proffesional Workers who Like to Go it Alone", New York Times, Oct. 14, 1999 [retrieved Jun. 23, 2005], pp. 1-3, retrieved from: Proquest Direct.*

(Continued)

*Primary Examiner* — Beth V Boswell
(74) *Attorney, Agent, or Firm* — Sterne, Kessler, Goldstein & Fox P.L.L.C.

(57) ABSTRACT

A method of generating employment market characteristics from a network includes the steps of accessing an employment resource including data via a network, matching the data to one of a plurality of employment market categories, and updating at least one statistical indicator associated with the matched employment market category.

32 Claims, 10 Drawing Sheets

U.S. PATENT DOCUMENTS

| | | | |
|---|---|---|---|
| 5,978,799 | A | 11/1999 | Hirsch |
| 5,999,912 | A | 12/1999 | Wodarz et al. |
| 6,006,225 | A | 12/1999 | Bowman et al. |
| 6,018,518 | A | 1/2000 | Smallwood et al. |
| 6,049,776 | A * | 4/2000 | Donnelly et al. ............... 705/8 |
| 6,055,510 | A | 4/2000 | Henrick et al. |
| 6,073,075 | A | 6/2000 | Kondou et al. |
| 6,085,244 | A | 7/2000 | Wookey |
| 6,091,777 | A | 7/2000 | Guetz et al. |
| 6,094,507 | A | 7/2000 | Monden |
| 6,101,485 | A | 8/2000 | Fortenberry et al. |
| 6,170,011 | B1 | 1/2001 | Macleod Beck et al. |
| 6,188,398 | B1 | 2/2001 | Collins-Rector et al. |
| 6,222,825 | B1 | 4/2001 | Mangin et al. |
| 6,233,520 | B1 | 5/2001 | Ito et al. |
| 6,263,020 | B1 | 7/2001 | Gardos et al. |
| 6,275,575 | B1 | 8/2001 | Wu |
| 6,282,540 | B1 | 8/2001 | Goldensher et al. |
| 6,289,340 | B1 * | 9/2001 | Puram et al. ............... 705/7.14 |
| 6,321,265 | B1 | 11/2001 | Najork et al. |
| 6,346,980 | B1 | 2/2002 | Tani et al. |
| 6,351,755 | B1 | 2/2002 | Najork et al. |
| 6,360,254 | B1 | 3/2002 | Linden et al. |
| 6,377,936 | B1 | 4/2002 | Henrick et al. |
| 6,397,219 | B2 | 5/2002 | Mills |
| 6,401,075 | B1 | 6/2002 | Mason et al. |
| 6,449,635 | B1 | 9/2002 | Tilden, Jr. et al. |
| 6,462,676 | B1 | 10/2002 | Koizumi |
| 6,466,940 | B1 | 10/2002 | Mills |
| 6,523,021 | B1 | 2/2003 | Monberg et al. |
| 6,539,080 | B1 | 3/2003 | Bruce et al. |
| 6,549,950 | B2 | 4/2003 | Lytle et al. |
| 6,560,243 | B1 | 5/2003 | Mogul |
| 6,578,022 | B1 | 6/2003 | Foulger et al. |
| 6,587,832 | B1 * | 7/2003 | Beck et al. ............... 705/9 |
| 6,594,666 | B1 | 7/2003 | Biswas et al. |
| 6,618,747 | B1 | 9/2003 | Flynn et al. |
| 6,657,558 | B2 | 12/2003 | Horita et al. |
| 6,662,194 | B1 * | 12/2003 | Joao ............... 707/104.1 |
| 6,668,281 | B1 | 12/2003 | Ayyadurai |
| 6,681,255 | B1 * | 1/2004 | Cooper et al. ............... 709/232 |
| 6,785,679 | B1 * | 8/2004 | Dane et al. ............... 1/1 |
| 6,791,943 | B1 | 9/2004 | Reynolds |
| 6,829,780 | B2 | 12/2004 | Kraft et al. |
| 6,854,007 | B1 | 2/2005 | Hammond |
| 7,007,010 | B2 | 2/2006 | Cooper |
| 7,065,555 | B2 | 6/2006 | Foulger et al. |
| 2001/0011226 | A1 | 8/2001 | Greer et al. |
| 2001/0039508 | A1 * | 11/2001 | Nagler et al. ............... 705/11 |
| 2001/0042000 | A1 * | 11/2001 | Defoor, Jr. ............... 705/9 |
| 2001/0047297 | A1 | 11/2001 | Wen |
| 2001/0054043 | A1 | 12/2001 | Harlan |
| 2002/0004733 | A1 | 1/2002 | Addante |
| 2002/0004753 | A1 | 1/2002 | Perkowski |
| 2002/0016730 | A1 | 2/2002 | Foulger et al. |
| 2002/0016809 | A1 | 2/2002 | Foulger et al. |
| 2002/0073343 | A1 | 6/2002 | Ziskind et al. |
| 2003/0145100 | A1 | 7/2003 | Marchetto et al. |
| 2003/0229638 | A1 * | 12/2003 | Carpenter et al. ............... 707/10 |
| 2004/0010484 | A1 | 1/2004 | Foulger et al. |
| 2004/0210589 | A1 | 10/2004 | Cooper et al. |
| 2004/0220821 | A1 | 11/2004 | Ericsson et al. |
| 2005/0171863 | A1 | 8/2005 | Hagen |
| 2005/0289005 | A1 | 12/2005 | Ferber et al. |
| 2006/0085263 | A1 | 4/2006 | Greer et al. |
| 2006/0129536 | A1 | 6/2006 | Foulger et al. |
| 2007/0016562 | A1 | 1/2007 | Cooper |
| 2007/0022170 | A1 | 1/2007 | Foulger et al. |
| 2007/0150804 | A1 | 6/2007 | Foulger et al. |
| 2007/0204219 | A1 | 8/2007 | Foulger et al. |

FOREIGN PATENT DOCUMENTS

| | | |
|---|---|---|
| JP | 08221479 A | 8/1996 |
| WO | WO 97/07467 | 2/1997 |
| WO | PCT/US97/19719 A2 | 10/1997 |
| WO | WO 98/20434 | 5/1998 |
| WO | PCT/US97/22151 | 6/1998 |
| WO | WO 98/27696 | 6/1998 |
| WO | WO 00/25508 | 5/2000 |
| WO | WO 01/13069 A1 | 2/2001 |
| WO | WO 01/65426 A1 | 9/2001 |

OTHER PUBLICATIONS

Houston, Lori, "ICPlanet: Running Perl in the Engine", www.oreilly.com, Apr. 1, 2000 [retrieved Jun. 23, 2005], p. 1-2, retrieved from: Google.com.*

Clark, Don, "E-Business: Starting Gate", Wall Street Journal, Apr. 24, 2000 [retrieved Jun. 23, 2005], pp. 1-3, retrieved from: Proquest Direct.*

Holzer, Harry, et al., "Jobs and Queues", The Quarterly Journal of Economics, Aug. 1991, pp. 739-768 (31 pages), retrieved from: Google.com.*

"Searching for work that pays: State Findings Idaho", http://idahocan.org/about/pubs/1999.0101_Searching.For.Work.That.Pays.pdf, Jan. 1, 1999, pp. 23-26 and 39-50 (16 pages), retrieved from: Google.com.*

Pischke, Jorn, et al., "Employment Effects of Immigration to Germany: An Analysis Based on Local Labor Markets", The Review of Economics and Statistics, Nov. 1997, pp. 594-604 (12 pages), retrieved from: Google.com.*

U.S. Appl. No. 60/199,376, filed Apr. 2000, Foulger et al.

U.S. Appl. No. 60/180,368, filed Feb. 2000, Carpenter et al.

"What is MD5 and Why Do I Care?" by Lance Spitzner http://www.enteract.com/~spitz/md5.html downloaded Mar. 20, 2000.

The MD5 Message Digest Algorithm by R.Rivest MIT Laboratory for Computer Science and RSA Data Security, Inc. Apr. 1992.

Applied Cryptography Protocols, Algorithms, and Source Code Inc. Schier, Bruce 1996.

Google Launches Full Suite of Fully Automated, Highly Customizable Websearch Services Based on Company's Award-Winning Search Technology Business Wire, p. 0420 Apr. 4, 2000.

RSS Feeds From CNET News.com/CNET News.com "http://news.com/2009-1090-980549.html?tag=ne.404 (downloaded May 15, 2006—3 pgs).

http://www.weather.com/services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998, IEEE, 1060-3425, 1-10.

Jin-gang Kim et al., Intelligent Information Recommend System on the Internet, 1999, IEEE.

IBM Technical Disclosure Bulletin, NN8905154, May 1989 2 pgs.

International Search report for Application No. PCT/US01 12648 Nov. 21, 2001, 6 pgs.

Anderson, D., "E-mail or Me-Mail?" The Industry Standard, IDG.net, Printed from http://www.thestandard/com/article/display/0,1151,12422,00.html, 4 pages (Mar. 6, 2000).

Cross, R. and Nassef, A., "E-Mail Direct Marketing Comes of Age," Direct Marketing, Hoke Communications, vol. 62, No. 6, pp. 44-45 (Oct. 1999).

"Top Ten Strategies for Direct Email Success," Boldfish Corporation, Printed from http://www.boldfish.com/BF-emguide/top-ten.html, 7 pages (Jan. 1, 2000).

English-Language Abstract of Japanese Patent Publication No. 2000020421, European Patent Office, 1 page (Jan. 21, 2000—Date of publication of application).

International Search Report from PCT Application No. PCT/US01/13137, 7 pages, mailed Aug. 28, 2002.

International Search Report from Application No. PCT/US01/13141, 7 pages, mailed Oct. 27, 2003.

Sanad et al. Mobile cellular/GPS/satellite antennas with both single-band and dual-band, Antennas and Propagation Society International Symposium, Jul. 16-20, 2000.

Nagy et al. Geographic Data Processing. ACM Computing Surveys. 1979, p. 139-181.

International Search report for Application No. PCT/US01 12510 Apr. 18, 2001, 6 pgs mailed Sep. 5, 2002.

Ju, J and Wang Y., "Scheduling PVM Tasks," XP000627434, Operating Systems Review (SIGOPS), ACM Headquarter, New York, NY, vol. 30, No. 3, Jul. 1, 1996, pp. 22-31.

"Mental Ray Specification," XP002195542, <http://www.id8media.com/3s_products/mental_ray2.htm>,[internet], retrieved on Apr. 8, 2002.

Taylor, A., "Press Release—Avid Announces New Release of softimage^3d 3.8sp2," XP002195543, <http://www.softimage.com/community/xsi/discuss/Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746, filed Apr. 18, 2000 entitled "Method, System, and Computer Program Product for Propagating Remotely Configurable Posters of Host Site Content".

* cited by examiner

METHOD, SYSTEM, AND COMPUTER PROGRAM PRODUCT FOR EMPLOYMENT MARKET STATISTICS GENERATION AND ANALYSIS

CROSS-REFERENCE TO RELATED APPLICATIONS

This patent application claims priority to and is entitled to the benefit of Provisional Patent Application No. 60/199,376, filed Apr. 25, 2000 entitled "Method, System, and Computer Program Product for Employment Market Statistics Generation and Analysis." This provisional application is incorporated herein by reference in its entirety.

The U.S. patent application entitled "Regulating Rates of Requests by a Spider Engine to Web Sites by Creating Instances of a Timing Module," U.S. application Ser. No. 09/552,559 (now U.S. Pat. No. 6,681,255), filed on Apr. 19, 2000, is related to the present application, and is herein incorporated by reference in its entirety.

BACKGROUND OF THE INVENTION

1. Field of the Invention

The present invention is directed to the collection of market statistics from a network.

2. Background Art

"Web crawlers", "robots", or "spider engines" are programs used to automatically search the Internet for web pages or documents of interest. The information found by the spider engine may be collected, cataloged, and otherwise used by search engines. For example, a spider engine may be directed to search for and collect particular types of data, such as product catalog information, or may randomly search and catalog all found web pages to create a web index. The spider engine may enter a particular web site, and search one or more web pages of the web site for information of interest.

Spider engines can collect a large amount of information. This information is difficult to analyze. Accordingly, there is a need for a method, system, and computer program product that generates statistics from data collected from a network.

BRIEF SUMMARY OF THE INVENTION

The present invention provides for the generation and analysis of market statistics from a network. A method of the present invention includes the steps of accessing a resource including data via a network, matching the data to one of a plurality of market categories, and updating at least one statistical indicator associated with the matched market category. These accessing, matching, and updating steps may be repeatedly performed.

The market categories may be associated with an employment market. In this example, the resource may be an employment resource, such as a resume or a job listing, and each of the plurality of market categories may correspond to a particular labor type and region.

Updating at least one statistical indicator may include incrementing one or more counters associated with the matched market category. In the context of an employment market, exemplary counters include the number of resumes associated with an employment market category, and the number of job listings associated with an employment market category.

Additionally or alternatively, this updating may include calculating a ratio of two statistical indicators. An exemplary ratio is number of resumes associated with a matched employment market category to the number of job listings associated with the matched employment market category.

Furthermore, this updating step may include marking the statistical indicator with a time stamp that indicates a current time interval, and storing the marked statistical indicator.

Matching the data to one of a plurality of market categories may include matching the employment resource to a raw category; matching the employment resource to an interim category; and matching the employment resource to an employment market category.

For each of the plurality of market categories, the associated statistical indicators may be plotted.

An advantage of the present invention is the ability to provide an accurate assessment of employment market characteristics.

BRIEF DESCRIPTION OF THE FIGURES

The accompanying drawings, which are incorporated herein and form a part of the specification, illustrate the present invention, and together with the description, further serve to explain the principles of the invention and to enable a person skilled in the pertinent art to make and use the invention.

Figure 1:
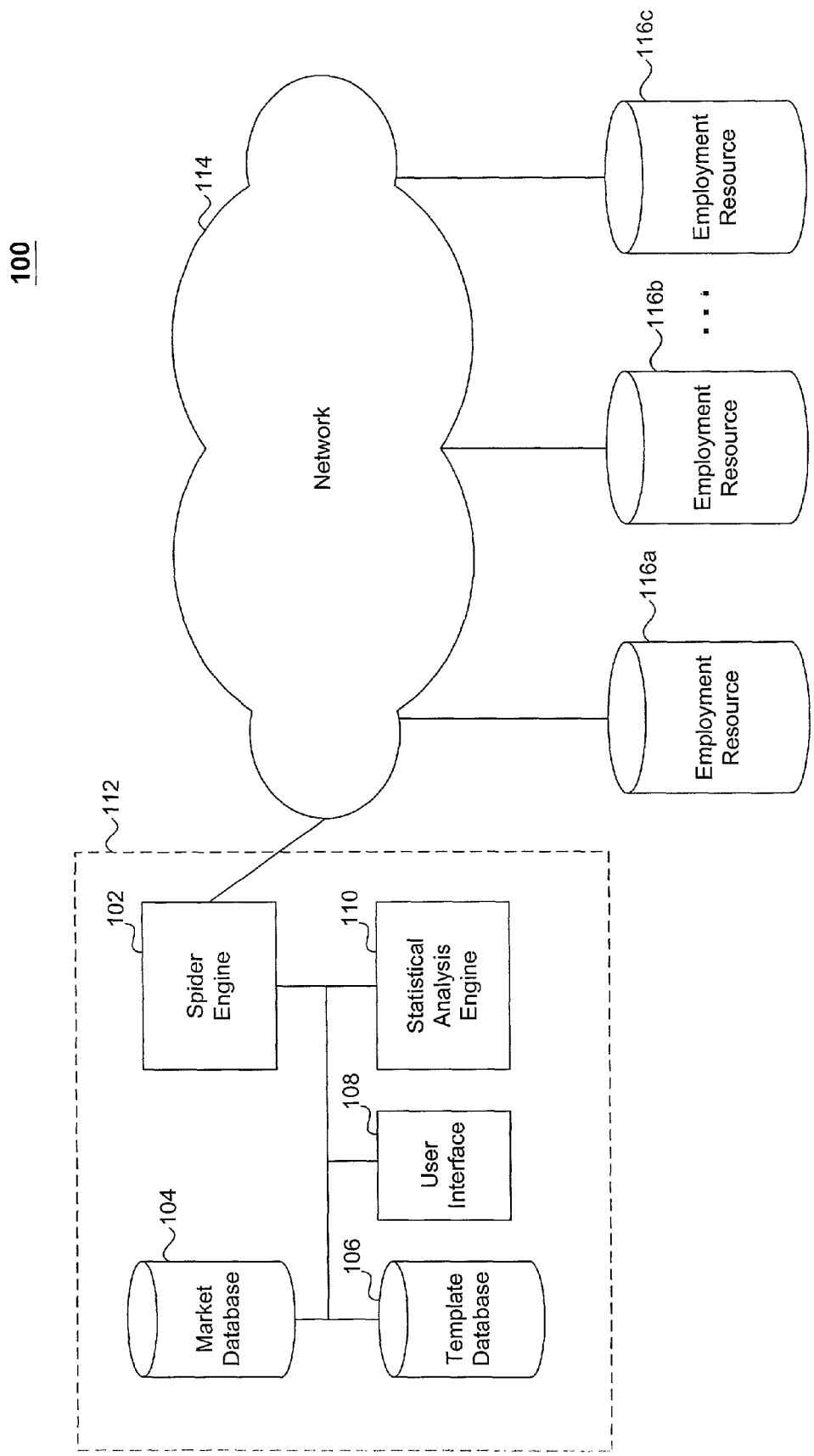
FIG. 1 illustrates an exemplary computer network according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

System Level Description

FIG. 1 illustrates an exemplary computer network 100 according to embodiments of the present invention. Computer network 100 includes an analysis node 112, a network 114, and a plurality of employment resources 116. Analysis node 112 includes a spider engine 102, a market database 104, a template database 106, a user interface 108, and a statistical analysis engine 110.

Spider engine 102 is connected to network 114 and conducts searches directed at gathering data from employment resources 116 across network 114. These searches are performed according to search criteria contained in templates that spider engine 102 receives from template database 106. Spider engine 102 can be implemented with hardware, software, firmware, or any combination thereof.

Network 114 is connected to spider engine 102 and one or more employment resources 116. In one embodiment, network 114 is a data network capable of transmitting information between processing platforms. An exemplary data network 114 is an Internet Protocol (IP), packet-switched network, such as the global Internet or an intranet. However, data network 114 can be other types of networks, such as a local area network (LAN), an asynchronous transfer mode (ATM) network, an X.25 network, a wireless packet-switched network, or any other network which would be apparent to persons skilled in the relevant art(s) from the teachings herein.

Employment resources 116 are also connected to network 114. Each employment resource 116 comprises data related to the employment market. In an embodiment, this employment market includes the market for independent consultants. Examples of employment resources 116 include resumes and job listings. In an embodiment, employment resources 116 are files stored in content servers (not shown) that are connected to data network 114. These files can be formatted according to markup languages such as HyperText Markup Language (HTML), Standard Generalized Markup Language (SGML), and other markup languages that would be apparent to persons skilled in the relevant art(s).

Accordingly, examples of employment resources 116 include online job postings on a company's (or other organization's) website, job and/or resume listings on an employment bulletin board, and job and/or resume listings on a placement service's website. However, employment resources can be other information resources accessible through a network, such as network 114.

Spider engine 102 accesses employment resources 116 via network 114 according to a client-server paradigm. In accordance with this paradigm, spider engine 102 accesses a particular employment resource 116 by sending a request across network 114. This request, also referred to herein as a query, is directed to a server or processing entity that stores the employment resource 116.

After such a request is received, a response is sent to spider engine 102 via network 114. This response includes the requested employment resource 116. In one embodiment, this client-server paradigm is conducted according to a protocol known as the Hypertext Transfer Protocol (HTTP). However, in further embodiments, other known protocols and/or communication schemes can be used in accordance with the present invention.

In embodiments of the present invention, statistical analysis node 112 comprises a plurality of spider engines 102 that can concurrently access employment resources independently or pursuant to a coordinated management process. Furthermore, spider engine(s) 102 can be implemented and/or operate as described in the application entitled "Regulating Rates of Requests by a Spider Engine to Web Sites by Creating Instances of a Timing Module," U.S. application Ser. No. 09/552,559 (now U.S. Pat. No. 6,681,255), filed on Apr. 19, 2000, (incorporated herein by reference in its entirety).

As described above, spider engine 102 uses templates received from template database 106 to extract data from received employment resources 116. According to the present invention, templates are written in a description language and include a series of codes or descriptors. Templates can be implemented in the form of computer files, data structures, network messages, or in other forms apparent to persons skilled in the relevant art(s) from the teachings herein. These codes and descriptors provide spider engine 102 with a list of data contained in employment resources 116, and indicate where such data resides within each employment resource 116.

Templates also direct spider engine 102 to organize data extracted from a received employment resource 116 into one or more data records. These data records include one or more fields. Each field contains a data item extracted from an employment resource 116. In the case of a resume, exemplary data items include name, age, vocation, education, employment objective, residence, phone number, and e-mail address. In the case of a job listing, exemplary data items include job title, employer, job location, employer contact information, and minimum eligibility requirements. However, the present invention can include other data items, as would be apparent to person skilled in the relevant art(s).

Market database 104 stores information pertaining to employment markets. In one embodiment, data record(s) extracted from employment resources 116 are stored in market database 104. Market database 104 can also store data derived from other sources. Examples of such data include economic information, such as population growth, spending data, eCommerce activities, the number of fortune 500 companies within a region, and other information apparent to persons skilled in the relevant art(s).

In an embodiment, user interface 108 is an output device that enables a user to receive information. Accordingly, user interface 108 can be a display and/or a printer. However, user interface 108 can also be other types of output devices, as would be apparent to persons skilled in the relevant art(s).

Statistical analysis engine 110 analyzes and processes data received from spider engine 102 and/or market database 104. As stated above, this data includes data extracted from employment resources 116. However, this data can also include other data, such as economic information stored in market database 104. In particular, statistical analysis engine 110 processes this data and generates statistics about employment markets. Statistical analysis engine 110 also outputs these statistics for analysis and interpretation by a user. Statistical analysis engine 110 can be implemented with hardware, software, firmware, or any combination thereof.

According to the present invention, analysis node 112 can be implemented as one or more systems comprising hardware, software, firmware, or any combination thereof. For example, spider engine 102 and statistical analysis engine 110 can be implemented by one or more computer systems. Furthermore, the elements of analysis node 112 can be distributed across network 114 and/or other networks, as would be apparent to persons skilled in the relevant art(s).

Operation

Figure 2:
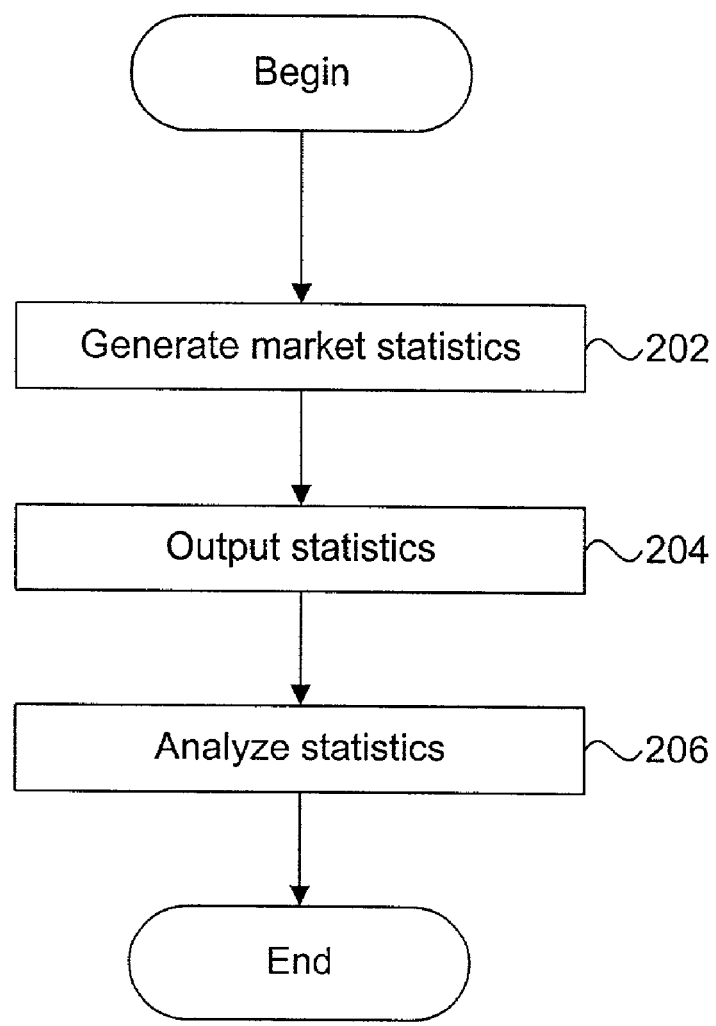
FIG. 2 is a flowchart illustrating a top level sequence of operation, according to the present invention.

FIG. 2 is a flowchart illustrating a top level operation of the present invention. This operation begins with a step 202. In step 202, employment market statistics are generated. In an embodiment, step 202 comprises a sequence of steps that are described below with reference to FIG. 3. Step 202 can be performed by statistical analysis engine 110, in conjunction with spider engine 102.

Next, in a step 204, statistics are output for analysis and interpretation by a user. In an embodiment, these statistics are output as charts by user interface 108. Step 204 can be performed by statistical analysis engine 110.

Next, in a step 206, a user analyzes statistics that are output in step 204. This analysis enables a user to determine dynamics and characteristics of employment markets.

Figure 3:
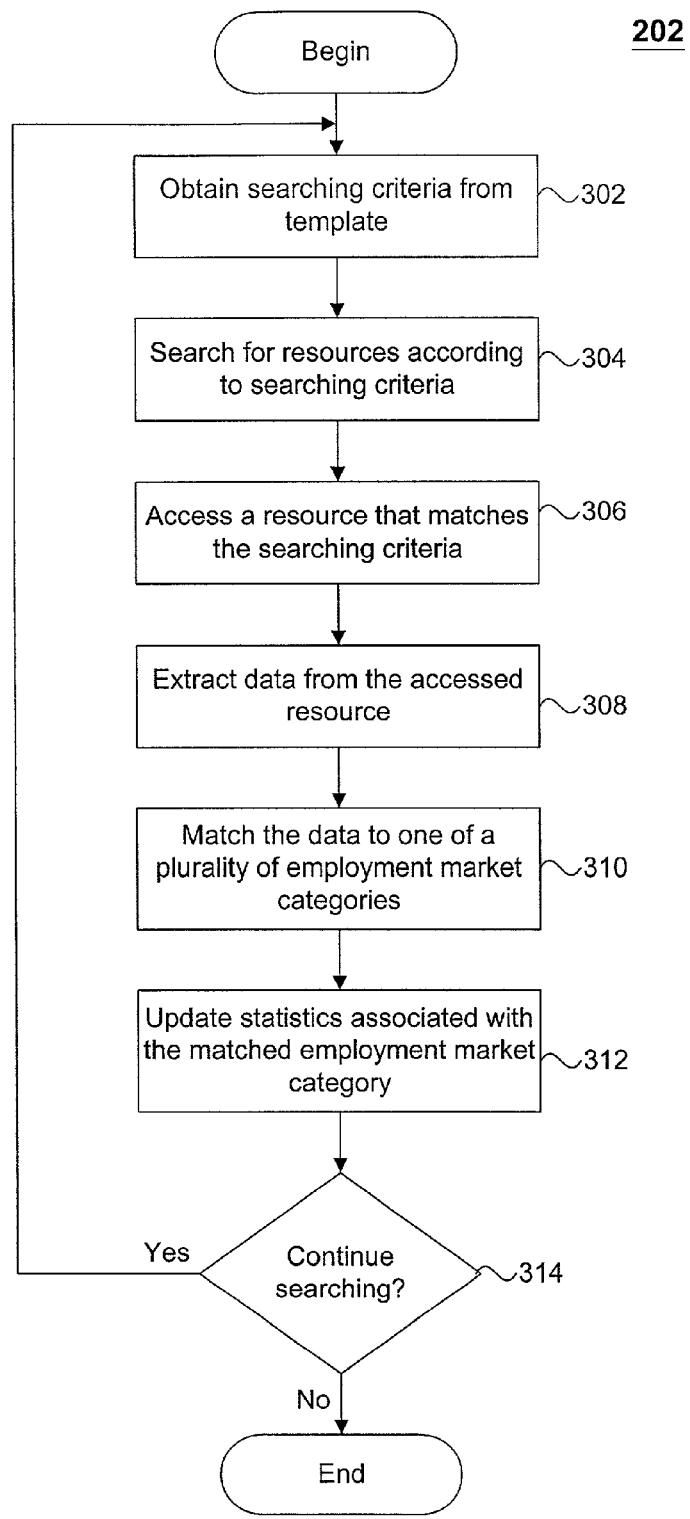
FIG. 3 is a flowchart illustrating the generation of employment market statistics, according to the present invention.

FIG. 3 is a flowchart illustrating a performance step 202 in greater detail. This performance begins with a step 302. In step 302, spider engine 102 obtains searching criteria from a template stored in template database 106. As described above, templates are used to describe information that spider engine 102 is seeking. Templates are written in a description language that describes resources across network 114. This description language describes what data is in each employment resource 116, and where data resides within each employment resource 116. Collectively, these descriptors form what is referred to herein as searching criteria because they determine which resources to gather across network 114, and how to seek and extract data from each of these resources.

Next, a step 304 is performed. In step 304, spider engine 102 searches for resources according to searching criteria contained in the template received from template database 106. According to the present invention, these resources are employment resources 116, as described above. These searching criteria can include search terms and optional logical expressions that specify desired information to be found in employment resources 116. This searching results in the identification of one or more resources that include information matching this searching criteria.

Next, in a step 306, spider engine 102 accesses a resource that satisfies the searching criteria. In one embodiment, this step comprises the steps of sending a client request across network 114 to a server or processing entity that contains a particular employment resource 116, and receiving the particular employment resource 116 via network 114. This request and response can be conducted according to the HTTP protocol, or any other protocol or scheme, as would be apparent to persons skilled in the relevant art(s).

A step 308 follows the performance of step 306. In step 308, spider engine 102 extracts data from the employment resource 116 accessed in step 306. This data extraction is performed according to codes and descriptors contained in the template received from template database 106 during the performance of step 302. For example, desired information can be parsed from resource 116 (e.g., a resume or a job listing), according to templates that correspond to the format of the particular resource 116.

In one embodiment, this extracted data is stored in data records. However, in a further embodiment, this data is stored internally in a composite data structure.

A step 310 follows the performance of step 308. In step 310, data extracted in step 308 is matched to one of a plurality of employment market categories. Employment market categories are statistical categories that are used to analyze data collected from a plurality of employment resources 116. In an embodiment, step 310 is performed by statistical analysis engine 110. The performance of this step is described in greater detail with reference to FIG. 4.

After step 310 is completed, a step 312 is performed. In step 312, statistical analysis engine 110 updates statistical indicators associated with the employment market category matched in step 310. In one embodiment, this step comprises incrementing a statistical counter associated with the matched employment market category. However, in accordance with the present invention, other types of statistical indicators can be updated.

A step 314 follows the performance of step 312. In step 314, the present invention determines whether to continue searching. This determination can be based on user specified parameters, dynamic run-time conditions, and/or other criteria, as would be apparent to persons skilled in the relevant art(s). Accordingly, if further searching is to be conducted, steps 302 through 312 are repeated. Otherwise, the generation of employment market statistics pursuant to step 202 is complete.

As described herein, steps 302 through 312 can be performed repeatedly. Often, one or more of these performances are associated with a time interval, such as a day, a week, a month, or any other time interval apparent to persons skilled in the relevant arts. Therefore, to associate market statistics with a particular time interval, step 312 may include the steps of marking the updated statistical indicator with a time stamp that indicates a current time interval and storing the marked statistical indicator for future access. These marking and storing steps can be performed by statistical analysis engine 110. Also, the statistics stored pursuant to this step, can be stored in market database 104.

Employment resources 116, such as job descriptions and resumes, can express talent, objectives, and employment opportunities in very diverse terms. This diversity can make the assessment of employment market characteristics difficult. In step 310 of FIG. 3, statistical analysis engine 110 matches data extracted from an accessed employment resource 116 with one of a plurality of employment market categories. This plurality of employment market categories provides a framework for a tractable assessment of employment market characteristics.

According to the present invention, employment market categories can be developed according to a variety of schemes. Examples of such schemes include labor type, region, labor type by region, and any other scheme that would be apparent from the teachings herein. A brief description of these schemes are provided below in Table 1.

TABLE 1

| Employment Market Category Development Scheme | Description |
|---|---|
| Labor Type | Categorizes employment markets by certain industries and/or vocations, such as information technology (IT), engineering, marketing, management, and accounting. |
| Region | Categorizes employment markets according to regional divisions, such as cities, states, zip codes, metropolitan areas, and other geographical regions |
| Labor Type By Region | Categorizes employment markets according to labor type as described above on a region by region basis. |

Unfortunately, employment resources 116 do not contain information that expressly categorizes them into particular employment market categories. For example, many resources 116 may be considered to be within the labor type employment market category of hospitality. However, these resources 116 may not include the term "hospitality." Instead, the resources 116 may include terms, such as "hotel," "resort," and/or "restaurant."

Accordingly, to provide for effective statistical analysis, the present invention features a category matching technique that matches resources to various employment market categories according to a multi-tiered matching strategy. An example of this strategy is described below with reference to FIG. 4.

Figure 4:
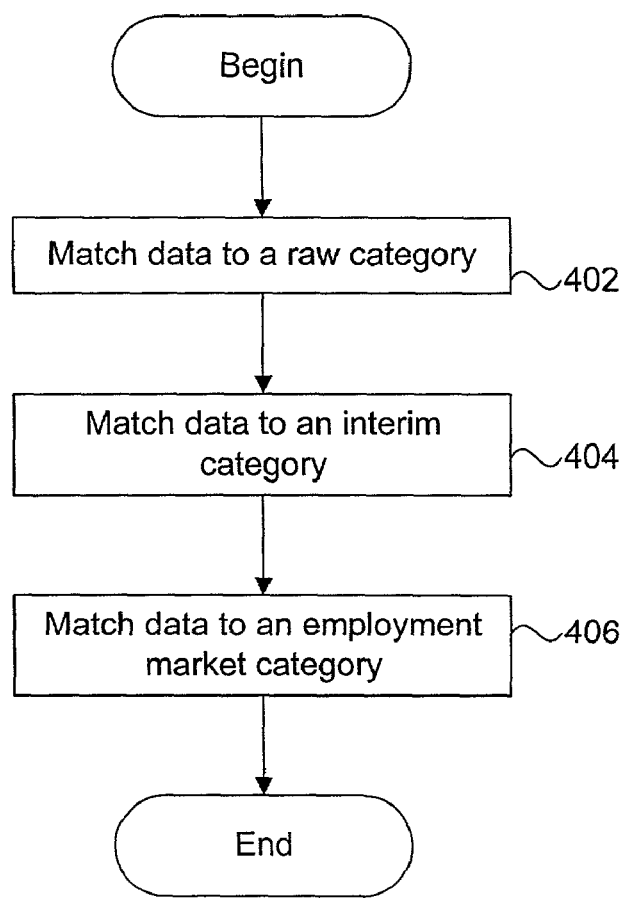
FIG. 4 is a flowchart illustrating the matching of data into employment market categories, according to the present invention.

FIG. 4 is a flowchart illustrating the performance of step 310 in greater detail. This performance begins with a step 402. In step 402, data extracted from an employment resource 116 in step 308 is matched to a raw category. In an embodiment, raw categories correspond to categories provided in employment resources 112. For example, in the case of a job listing, a raw category can be a job title contained in the job listing. In the case of a resume, a raw category can be an employment objective contained in the resume. However, raw categories can also be based on other data extracted from employment resources.

After the performance of step 402, a step 404 is performed. In step 404, the data extracted from an employment resource 116 in step 308 is matched to an interim category. According to the present invention, there are fewer interim categories than raw categories.

A step 406 follows step 404. In step 406, the data extracted from an employment resource 116 in step 308 is matched to an employment market category. According to the present invention, there are fewer employment market categories than interim categories. The matched employment market category can be based on a labor type, a region, or a labor type by region scheme, as described above. In addition, the matched employment market category can be based on any other scheme that would be apparent to persons skilled in the relevant art(s).

According to the present invention, steps 402, 404, and 406 are performed according to word matching techniques that compare portions of words, such as word beginnings and endings. These techniques enable the matching of employment resources 116 to the appropriate raw, interim, and employment market categories. These techniques can involve fuzzy logic, and/or other technologies. In an embodiment of the present invention, step 402 is performed by statistical analysis engine 110.

As described above with reference to FIG. 2, the present invention outputs statistics in step 204. These statistics are generated during the performance of step 202, which was described above in greater detail with reference to FIG. 3. In one embodiment, these statistics are output in the form of one or more charts. However, in further embodiments, these statistics are output as tabular data, and/or in any other form that would be apparent to a person skilled in the relevant art(s).

These charts are organized according to employment market categories. As described above, employment market categories can be developed according to various schemes such as labor type, region, and labor type by regions. For each of these employment market categories, there are one or more statistical indicators that characterize the corresponding employment market category. In an embodiment where network 114 is the Internet, these assessment are highly accurate because, in the aggregate, employment resources accessible via the Internet (as well as other data networks) accurately reflect employment markets in general.

Using labor category by region as an example, the IT labor type in one region can have statistical indicators of 100 resumes and 300 job listings. Alternatively, the IT labor type in a different region may have statistical indicators of 500 resumes and only 100 job listings. Based on such statistical indicators, user(s) can perform analysis of employment market characteristics.

Figure 5:
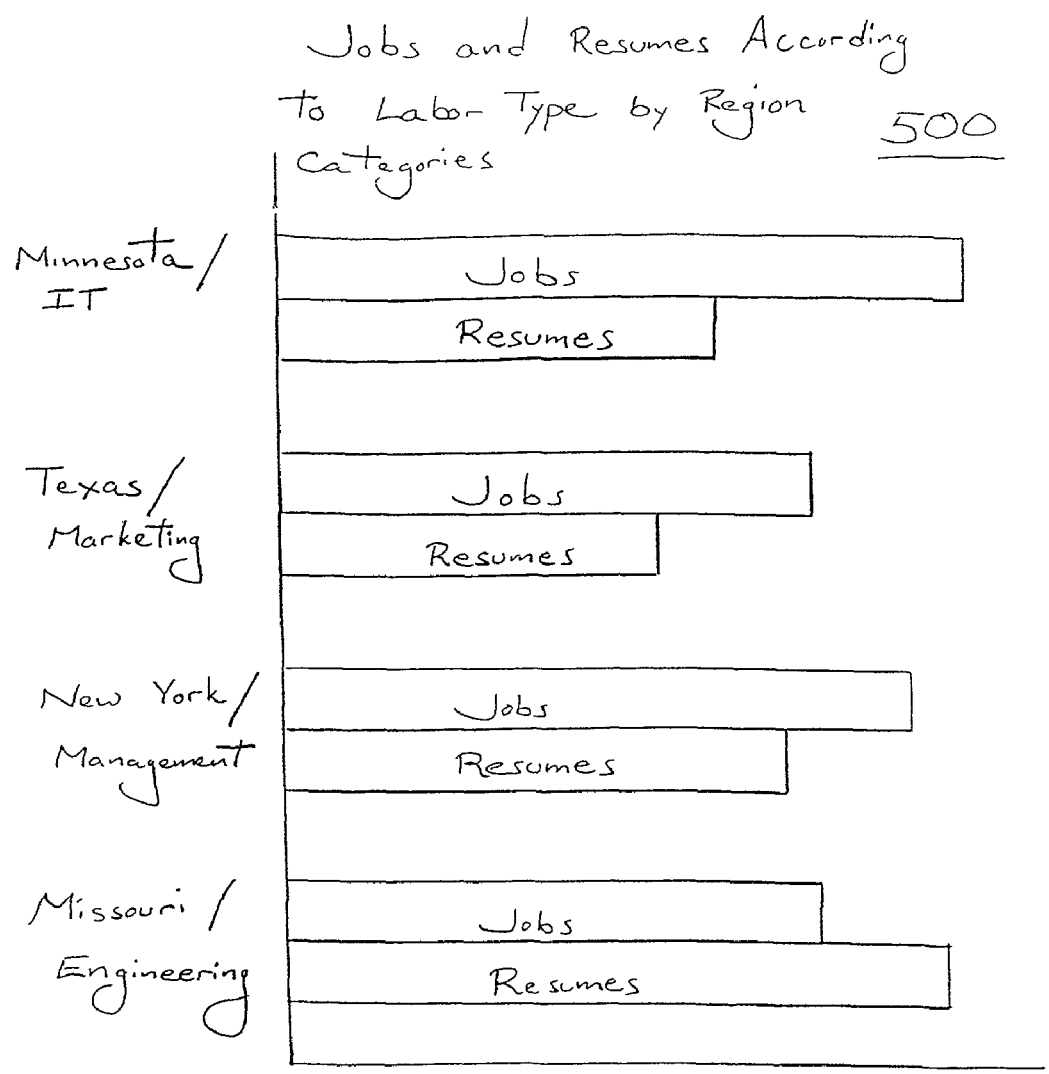
FIGS. 5, 6, and 7 are exemplary output charts, according to the present invention.

FIG. 5 is a first exemplary output chart 500. According to the present invention, this chart can be generated during the performance of step 204. Output chart 500 illustrates a bar chart containing statistical indicators for a plurality of labor type by region employment market categories. These statistical indicators are number of resumes and number of job listings for a plurality of labor type by region market categories. In output chart 500, for each region and labor type category the number of job listings a plotted adjacent to the number of resumes. This juxtaposition enables an indication as well as a basis for comparison of supply and demand in each individual employment market category.

Figure 6:
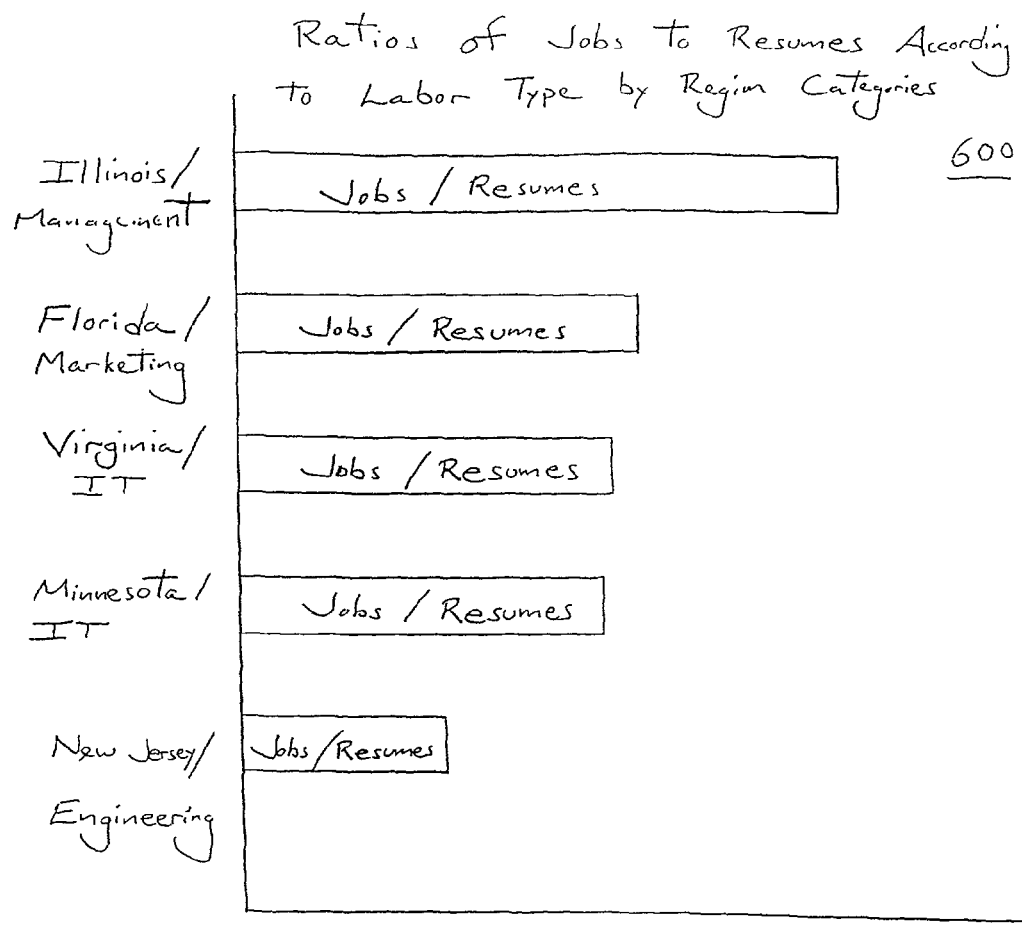

FIG. 6 is a second exemplary output chart 600. Like output chart 500, this chart can also be generated during the performance of step 204. Output chart 600 illustrates the ratio of job listings to resumes for a plurality of labor type by region market categories. As shown in FIG. 6, output chart 600 is a bar chart containing statistical indicators for a plurality of labor type by region employment market categories. These statistical indicators are the ratios of the number of job listings to the number of resumes for a plurality of labor type by region market categories. In output chart 600, These indicators are plotted in decreasing order to enable a user to identify regions where demand for employment is high.

As described above with reference to FIG. 4, the present invention can associate market statistics with particular time intervals and store these statistics in market database 104. Accordingly, step 204 can include outputting a plurality of statistics that are each associated with a particular time interval. This feature advantageously enables a user to identify trends, such as employment market trends.

Figure 7:
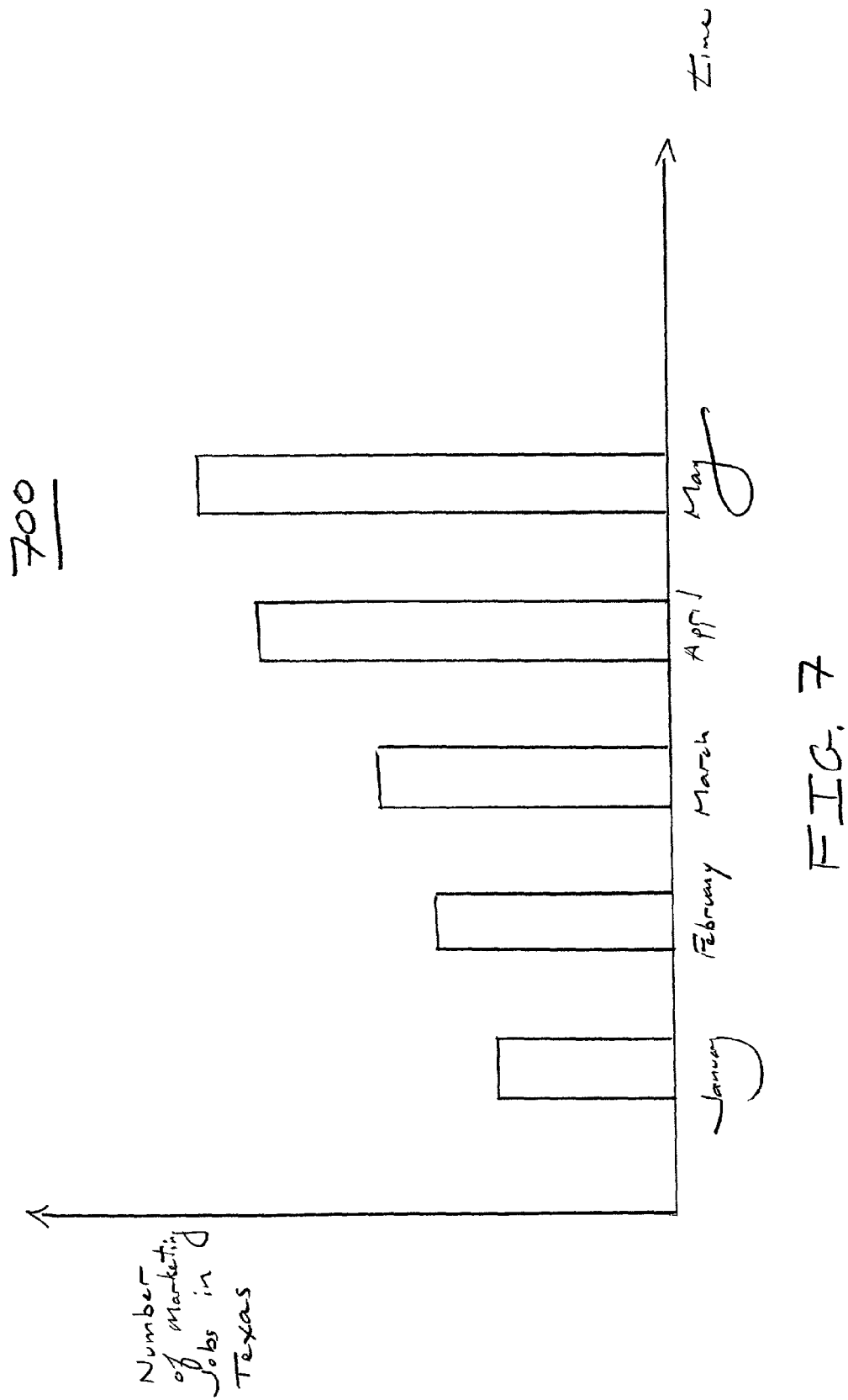

FIG. 7 is a third exemplary output chart 700. According to the present invention, this chart can be generated during the performance of step 204. Output chart 700 illustrates a bar chart containing statistical indicators for a particular labor type by region employment market category. These statistical indicators are number of job listings for a series of months. In output chart 700, for each month the number of job listings for marketing jobs in Texas is plotted adjacent versus a time axis that indicates corresponding months. This plotting arrangement indicates the dynamic nature of this employment market category statistic and enables trend identification. For example, output chart 700 indicates that the number of marketing jobs in Texas has been increasing. This trend identification enables forecasting of employment marketing statistics.

As described above with reference to FIG. 2, in step 206, a user analyzes data that is output during the performance of step 204. For instance, using the exemplary output illustrated in FIGS. 5-7, a user can assess and compare the demand for particular labor types across different regions. This assessment and comparison enables user(s) to determine the likelihood of employment placings, as well as other characteristics of labor market categories. These determinations enable users that match people such as independent consultants with jobs and projects to focus on labor market categories where there is a high demand. For example, as shown in FIG. 6, for the employment market category of management jobs in Illinois, there is a higher ratio of jobs to resumes than in the employment market category of marketing jobs in Florida. Accordingly, these indicators can support the conclusion that there is a higher likelihood of placement for management jobs in Illinois than for marketing jobs in Florida.

Moreover, step 206 may comprise a user analyzing trends in an employment market. For example, a user may review information (e.g., statistics), such as the exemplary statistics shown in FIG. 7 that indicates the dynamic nature of employment market category statistics. Accordingly, step 206 can include trend identification, and market category statistics forecasting.

For example, chart 700 indicates a trend of increasing employment opportunities. This trend of increasing opportunities can be used to forecast further increases. Such forecasting can advantageously provide assistance in planning activities, such as market price (e.g., wage and/or salary) prediction, and transactional lead times (e.g., time necessary to fill staffing/labor requirements with employees and/or consultants).

EXAMPLE NETWORK ENVIRONMENT

The present invention can be implemented in any communication network, such as, the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java 1.1. Java-enabled browsers are used, such as, Netscape, HotJava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description.

Figure 8A:
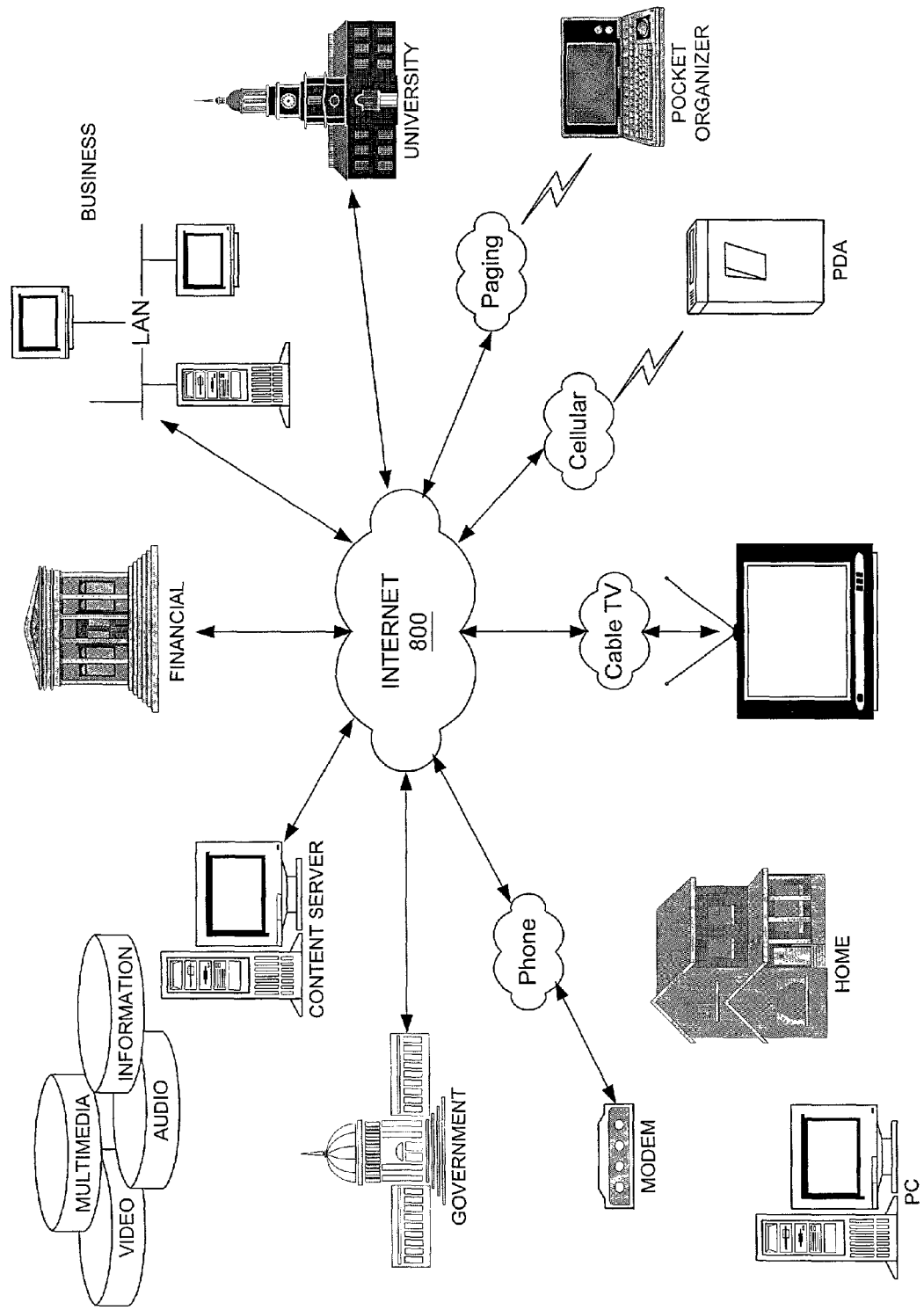
FIG. 8A is a diagram of an example internetwork environment according to the present invention.

FIG. 8A is a diagram of an example internetwork environment according to the present invention. FIG. 8A shows a communication network or combination of networks (Internet) 800 which can support the invention. Internet 800 consists of interconnected computers which supports communication between many different types of users including businesses, universities, individuals, government, and financial institutions. Internet 800 supports many different types of communication links implemented in a variety of architectures. For example, voice and data links can be used including phone, paging, cellular, and cable TV (CATV) links. Terminal equipment can include local area networks, personal computers with modems, content servers of multi-media, audio, video, and other information, pocket organizers, Personal Data Assistants (PDAs), and set-top boxes.

Figure 8B:
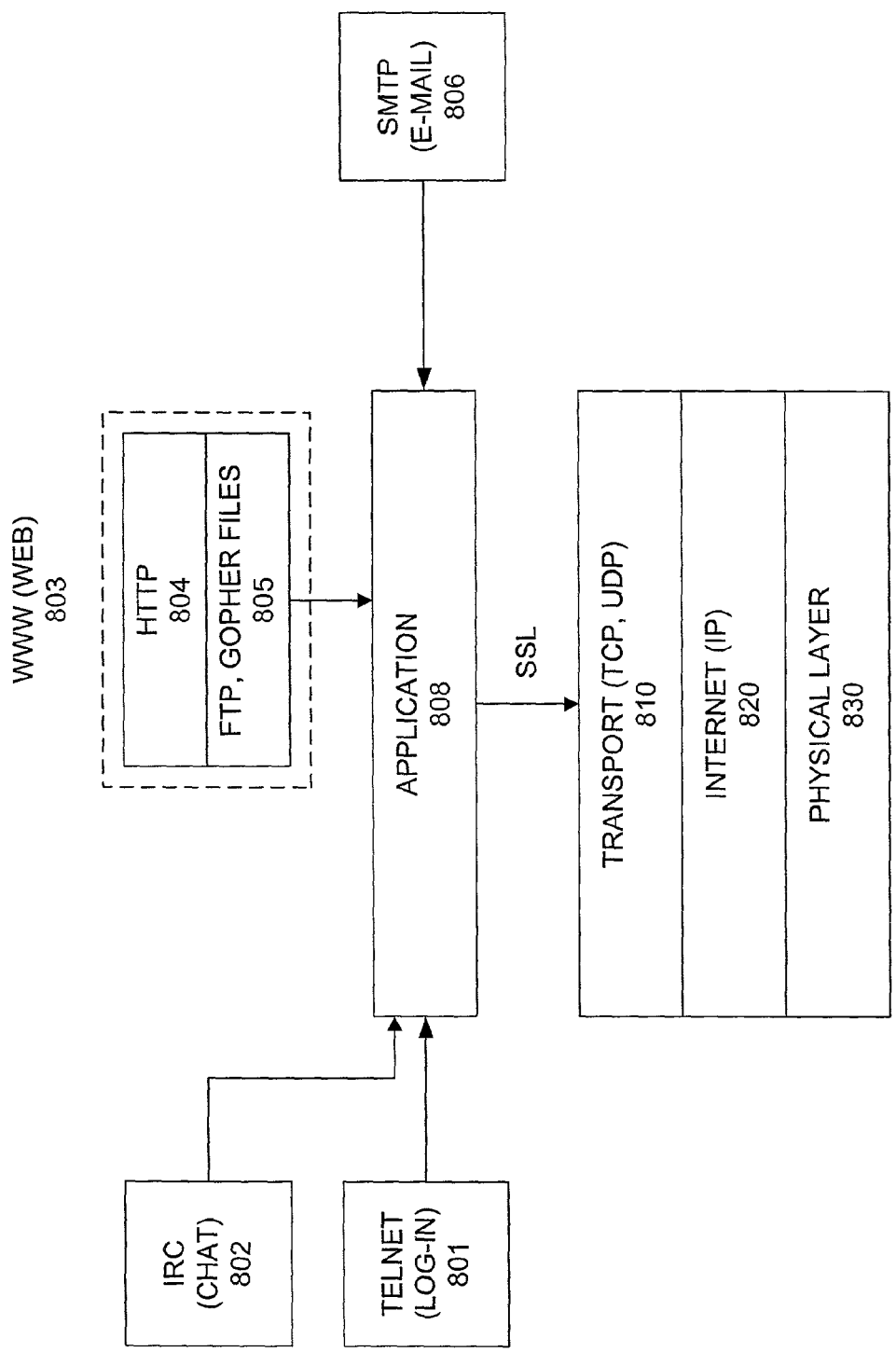
FIG. 8B shows a simplified four-layered communication model supporting Web commerce.

Communication over a communication network such as, Internet 800, is carried out through different layers of communication. FIG. 8B shows a simplified four-layered communication model supporting Web commerce including an application layer 808, transport layer 810, Internet layer 820, physical layer 830. As would be apparent to a person skilled in the art, in practice, a number of different layers can be used depending upon a particular network design and communication application. Application layer 808 represents the different tools and information services which are used to access the information over the Internet. Such tools include, but are not limited to, telnet log-in service 801, IRC chat 802, Web service 803, and SMTP (Simple Mail Transfer Protocol) electronic mail service 806. Web service 803 allows access to HTTP documents 804, and FTP and Gopher files 805. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

Example Computer System

Figure 8C:
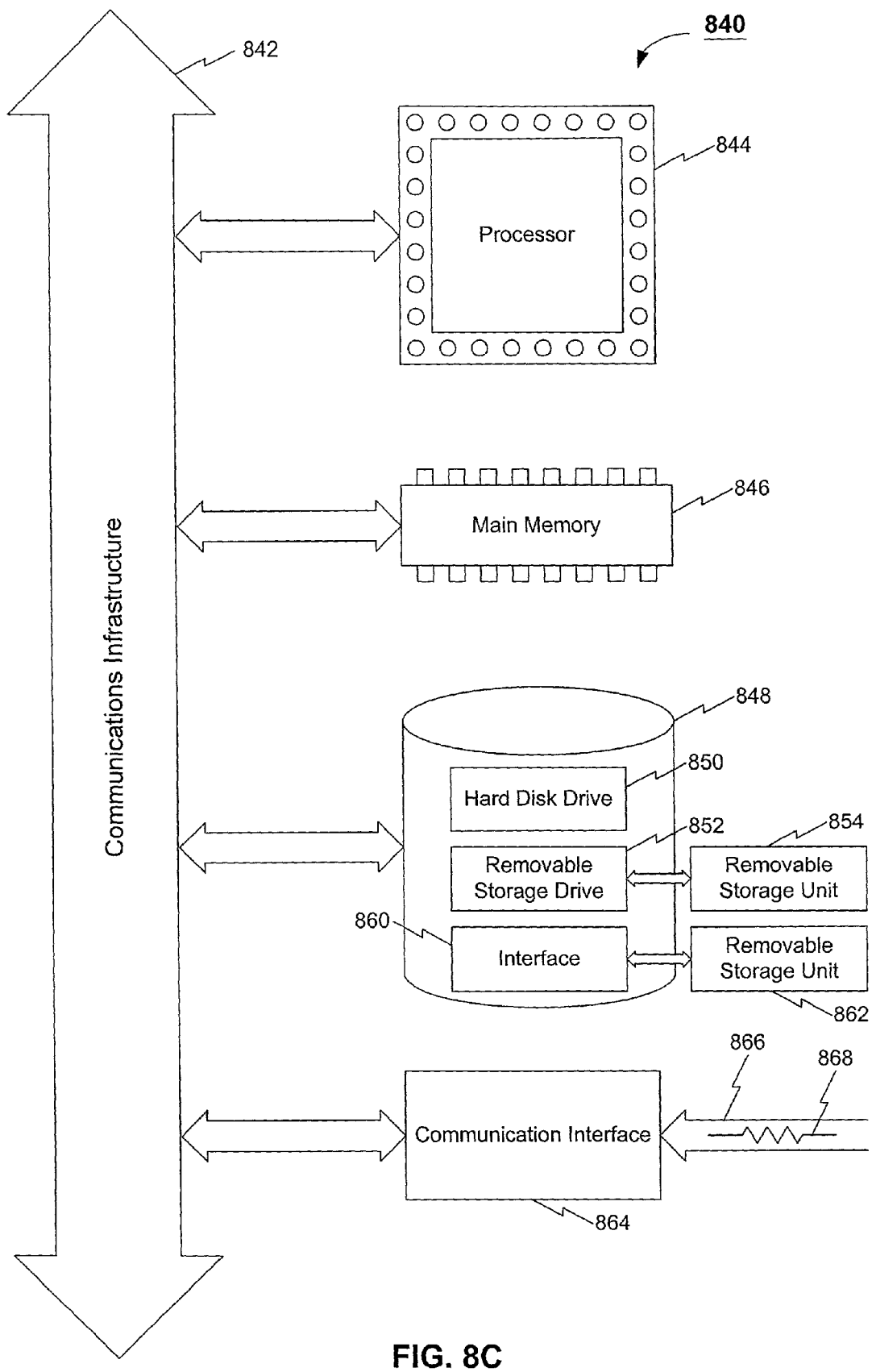
FIG. 8C is a block diagram of a computer system according to an example implementation of the present invention.

An example of a computer system 840 is shown in FIG. 8C. The computer system 840 represents any single or multi-processor computer. Single-threaded and multi-threaded computers can be used. Unified or distributed memory systems can be used.

Computer system 840 includes one or more processors, such as processor 844. One or more processors 844 can execute software implementing the process described above with reference to FIGS. 2, 3, and 4. Each processor 844 is connected to a communication infrastructure 842 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 840 also includes a main memory 846, preferably random access memory (RAM), and can also include a secondary memory 847. The secondary memory 847 can include, for example, a hard disk drive 850 and/or a removable storage drive 852, representing a floppy disk drive, a magnetic tape drive, an optical disk drive, etc. The removable storage drive 852 reads from and/or writes to a removable storage unit 854 in a well known manner. Removable storage unit 854 represents a floppy disk, magnetic tape, optical disk, etc., which is read by and written to by removable storage drive 852. As will be appreciated, the removable storage unit 854 includes a computer usable storage medium having stored therein computer software and/or data.

In alternative embodiments, secondary memory 847 may include other similar means for allowing computer programs or other instructions to be loaded into computer system 840. Such means can include, for example, a removable storage unit 862 and an interface 860. Examples can include a program cartridge and cartridge interface (such as that found in video game devices), a removable memory chip (such as an EPROM, or PROM) and associated socket, and other removable storage units 862 and interfaces 860 which allow software and data to be transferred from the removable storage unit 862 to computer system 840.

Computer system 840 can also include a communications interface 864. Communications interface 864 allows software and data to be transferred between computer system 840 and external devices via communications path 866. Examples of communications interface 864 can include a modem, a network interface (such as Ethernet card), a communications port, etc. Software and data transferred via communications interface 864 are in the form of signals which can be electronic, electromagnetic, optical or other signals capable of being received by communications interface 864, via communications path 866. Note that communications interface 864 provides a means by which computer system 840 can interface to a network such as the Internet.

The present invention can be implemented using software running (that is, executing) in an environment similar to that described above with respect to FIG. 8A. In this document, the term "computer program product" is used to generally refer to removable storage unit 854, a hard disk installed in hard disk drive 850, or a carrier wave carrying software over a communication path 866 (wireless link or cable) to communication interface 864. A computer useable medium can include magnetic media, optical media, or other recordable media, or media that transmits a carrier wave or other signal. These computer program products are means for providing software to computer system 840.

Computer programs (also called computer control logic) are stored in main memory 846 and/or secondary memory 847. Computer programs can also be received via communications interface 864. Such computer programs, when executed, enable the computer system 840 to perform the features of the present invention as discussed herein. In particular, the computer programs, when executed, enable the processor 844 to perform the features of the present invention. Accordingly, such computer programs represent controllers of the computer system 840.

The present invention can be implemented as control logic in software, firmware, hardware or any combination thereof. In an embodiment where the invention is implemented using software, the software may be stored in a computer program product and loaded into computer system 840 using removable storage drive 852, hard drive 850, or interface 860. Alternatively, the computer program product may be downloaded to computer system 840 over communications path 866. The control logic (software), when executed by the one or more processors 844, causes the processor(s) 844 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. For example, the present invention can involve other types of markets and information, such as website user traffic statistics, that can be collected via a network.

Thus, the breadth and scope of the present invention should not be limited by any of the above-described exemplary embodiments, but should be defined only in accordance with the following claims and their equivalents.

What is claimed is:

1. A method of generating employment market statistics via a network, comprising:
    accessing, by a data processing device, an employment resource via the network, the employment resource comprising data;
    matching, by the data processing device, the data to one of a plurality of employment market categories, wherein the matching includes matching resources to the plurality of employment market categories according to a multi-tiered matching strategy; and
    updating, by the data processing device, at least one statistical indicator associated with a matched employment market category, wherein the updating comprises calculating a ratio of resumes associated with the matched employment market category to job listings associated with the matched employment market category.

2. The method of claim 1, wherein each of the plurality of market categories corresponds to a particular labor type and region.

3. The method of claim 1, wherein the matching comprises:
    matching the employment resource to a raw category;
    matching the employment resource to an interim category; and
    matching the employment resource to an employment market category.

4. The method of claim 1, wherein the accessing an employment resource comprises:
    sending a client request across the network to a server; and
    receiving the employment resource via the network.

5. The method of claim 1, further comprising:
    repeating the accessing, matching, and updating for each of a plurality of employment resources; and
    for each of the plurality of market categories, plotting the associated statistical indicator.

6. A method of generating employment market statistics from a network, comprising:
    accessing, by a data processing device, an employment resource via the network, the employment resource comprising data;
    matching, by the data processing device, the data to one of a plurality of employment market categories, wherein the matching includes matching resources to the plurality of employment market categories according to a multi-tiered matching strategy; and
    updating, by the data processing device, at least one statistical indicator associated with a matched employment market category;
    wherein the updating comprises:
        incrementing a first counter associated with the matched employment market category in response to determining the employment resource is a resume; and
        incrementing a second counter associated with the matched employment market category in response to determining the employment resource is a job listing.

7. The method of claim 6, wherein each of the plurality of market categories corresponds to a particular labor type and region.

8. The method of claim 6, wherein the matching comprises:
    matching the employment resource to a raw category;
    matching the employment resource to an interim category; and
    matching the employment resource to an employment market category.

9. The method of claim 6, wherein the accessing comprises:
    sending a client request across the network to a server; and
    receiving the employment resource via the network.

10. The method of claim 6, further comprising:
    repeating the accessing, matching, and updating for each of a plurality of employment resources; and
    for each of the plurality of market categories, plotting the associated statistical indicator.

11. A system for generating employment market statistics from a network, comprising:
    means for accessing an employment resource via the network, the employment resource comprising data;
    means for matching the data to one of a plurality of employment market categories, wherein the matching includes matching resources to the plurality of employment market categories according to a multi-tiered matching strategy; and
    means for updating at least one statistical indicator associated with the matched employment market category;
    wherein said means for updating at least one statistical indicator comprises means for calculating a ratio of resumes associated with the matched employment market category to job listings associated with the matched employment market category.

12. The system of claim 11, wherein each of the plurality of market categories corresponds to a particular labor type and region.

13. The system of claim 11, wherein said means for matching the data to one of a plurality of employment market categories comprises:
    means for matching, the employment resource to a raw category;
    means for matching the employment resource to an interim category; and
    means for matching the employment resource to an employment market category.

14. The system of claim 11, wherein said means for accessing an employment resource comprises:
 means for sending a client request across the network to a server; and
 means for receiving the employment resource via the network.

15. The system of claim 11, further comprising means for plotting the associated statistical indicator for each of the plurality of market categories.

16. A system for generating employment market statistics from a network, comprising:
 means for accessing an employment resource via the network, the employment resource comprising data;
 means for matching the data to one of a plurality of employment market categories, wherein the matching includes matching resources to the plurality of employment market categories according to a multi-tiered matching strategy; and
 means for updating at least one statistical indicator associated with the matched employment market category;
 wherein said means for updating at least one statistical indicator comprises:
  means for incrementing a first counter associated with the matched employment market category in response to determining the employment resource is a resume; and
  means for incrementing a second counter associated with the matched employment market category in response to determining the employment resource is a job listing.

17. The system of claim 16, wherein each of the plurality of market categories corresponds to a particular labor type and region.

18. The system of claim 16, wherein said means for matching the data to one of a plurality of employment market categories comprises:
 means for matching the employment resource to a raw category;
 means for matching the employment resource to an interim category; and
 means for matching the employment resource to an employment market category.

19. The system of claim 16, wherein said means for accessing an employment resource comprises:
 means for sending a client request across the network to a server; and
 means for receiving the employment resource via the network.

20. The system of claim 16, further comprising means for plotting the associated statistical indicator for each of the plurality of market categories.

21. A system for generating employment market statistics from a network, comprising:
 a data processing device configured with:
  a spider engine that accesses an employment resource via the network, the employment resource comprising data; and
  a statistical analysis engine that matches the data to one of a plurality of employment market categories, wherein the matching includes matching resources to the plurality of employment market categories according to a multi-tiered matching strategy, and that calculates a ratio of resumes associated with the matched employment market category to job listings associated with the matched employment market category.

22. A computer-readable storage medium having stored thereon computer-executable instructions, execution of which by a data processing device causes the data processing device to perform operations for generating employment market statistics from a network, the operations comprising:
 accessing an employment resource via the network, the employment resource comprising data;
 matching the data to one of a plurality of employment market categories, wherein the matching includes matching resources to the plurality of employment market categories according to a multi-tiered matching strategy; and
 updating at least one statistical indicator associated with the matched employment market category;
 wherein the updating at least one statistical indicator comprises calculating a ratio of resumes associated with the matched employment market category to job listings associated with the matched employment market category.

23. The computer-readable storage medium of claim 22, wherein each of the plurality of market categories corresponds to a particular labor type and region.

24. The computer-readable storage medium of claim 22, wherein the operation of matching the data to one of a plurality of employment market categories comprises:
 matching the employment resource to a raw category;
 matching the employment resource to an interim category; and
 matching the employment resource to an employment market category.

25. The computer-readable storage medium of claim 22, wherein the operation of accessing an employment resource comprises:
 sending a client request across the network to a server; and
 receiving the employment resource via the network.

26. The computer-readable storage medium of claim 22, wherein the operations further comprise plotting the associated statistical indicator for each of the plurality of market categories.

27. A computer-readable storage medium having stored thereon computer-executable instructions, execution of which by a data processing device causes the data processing device to perform operations for generating employment market statistics from a network, the operations comprising:
 accessing an employment resource via the network, the employment resource comprising data;
 matching the data to one of a plurality of employment market categories, wherein the matching includes matching resources to the plurality of employment market categories according to a multi-tiered matching strategy; and
 updating at least one statistical indicator associated with the matched employment market category;
 wherein the updating at least one statistical indicator comprises:
  incrementing a first counter associated with the matched employment market category in response to determining the employment resource is a resume; and
  incrementing a second counter associated with the matched employment market category in response to determining the employment resource is a job listing.

28. The computer-readable storage medium of claim 27, wherein each of the plurality of market categories corresponds to a particular labor type and region.

29. The computer-readable storage medium of claim 27, wherein the operation of matching the data to one of a plurality of employment market categories comprises:

matching the employment resource to a raw category;

matching the employment resource to an interim category; and matching the employment resource to an employment market category.

30. The computer-readable storage medium of claim 27, wherein the operation of accessing an employment resource comprises:

sending a client request across the network to a server; and receiving the employment resource via the network.

31. The computer-readable storage medium of claim 27, the operations further comprising plotting the associated statistical indicator for each of the plurality of market categories.

32. A system for generating employment market statistics from a network, comprising:

a processing device configured with:

a spider engine that accesses an employment resource via the network, the employment resource comprising data; and a statistical analysis engine that matches the data to one of a plurality of employment market categories, wherein the matching includes matching resources to the plurality of employment market categories according to a multi-tiered matching strategy, and wherein the statistical analysis engine increments a first counter associated with the matched employment market category in response to determining the employment resource is a resume and increments a second counter associated with the matched employment market category in response to determining the employment resource is a job listing.

* * * * *

UNITED STATES PATENT AND TRADEMARK OFFICE
CERTIFICATE OF CORRECTION

PATENT NO. : 8,015,047 B2  Page 1 of 1
APPLICATION NO. : 09/841167
DATED : September 6, 2011
INVENTOR(S) : Foulger et al.

It is certified that error appears in the above-identified patent and that said Letters Patent is hereby corrected as shown below:

Title Page, item (56), under "Other Publications", in Column 2, Line 1, delete "Proffesional" and insert -- Professional --.

Page 3, item (56), under "Other Publications", in Column 2, Line 4, delete "bit.Iistserve.novell." and insert -- bit.listserve.novell. --.

Column 12, line 62, in Claim 13, delete "matching," and insert -- matching --.

Signed and Sealed this
Twentieth Day of March, 2012

David J. Kappos
*Director of the United States Patent and Trademark Office*